R. W. GOTSHALL.
THRESHING MACHINE.
APPLICATION FILED OCT. 29, 1906.
938,139.
Patented Oct. 26, 1909.
3 SHEETS—SHEET 1.
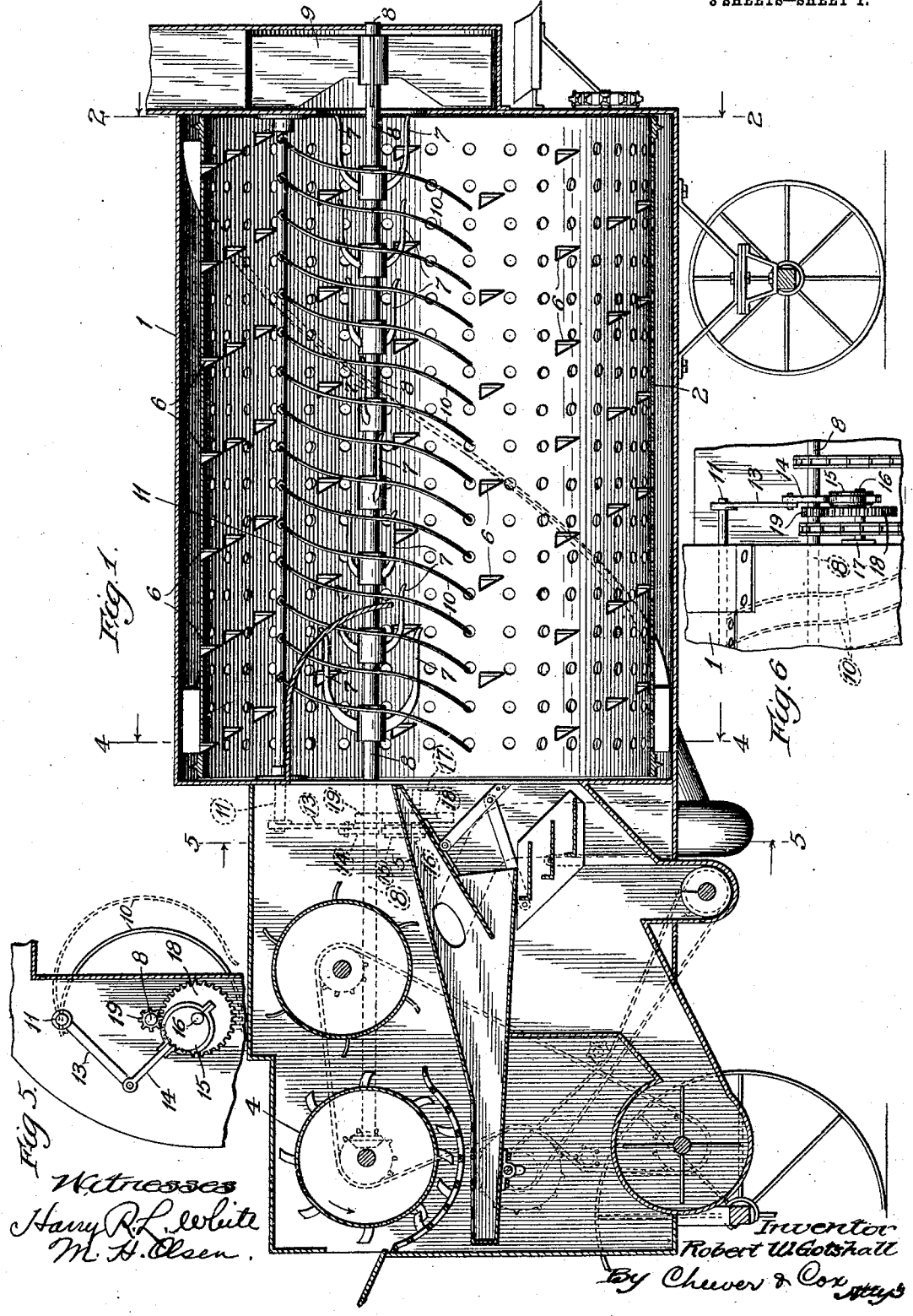

R. W. GOTSHALL.
THRESHING MACHINE.
APPLICATION FILED OCT. 29, 1906.
938,139.
Patented Oct. 26, 1909.
3 SHEETS—SHEET 2.
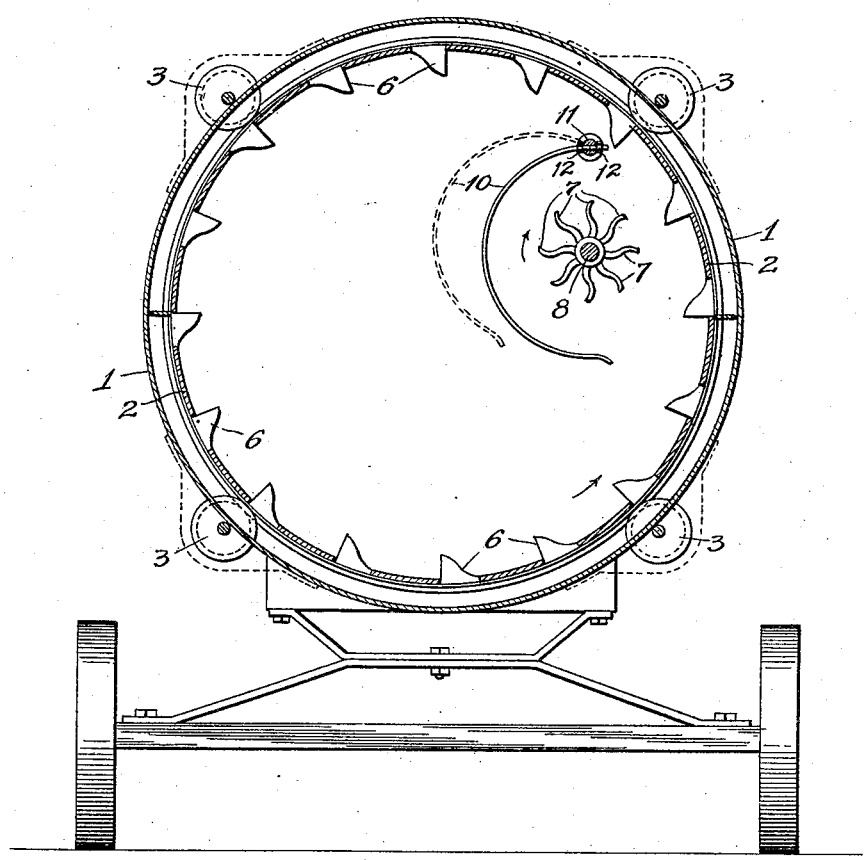
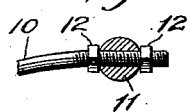

R. W. GOTSHALL.
THRESHING MACHINE.
APPLICATION FILED OCT. 29, 1906.

938,139.

Patented Oct. 26, 1909.
3 SHEETS—SHEET 3.

Witnesses,
Harry R. L. White
M. H. Olsen

Inventor
Robert W. Gotshall
By Cheever & Cox
Attys

UNITED STATES PATENT OFFICE.

ROBERT W. GOTSHALL, OF MARION, OHIO.

THRESHING-MACHINE.

938,139.

Specification of Letters Patent. Patented Oct. 26, 1909.

Application filed October 29, 1906. Serial No. 341,124.

*To all whom it may concern:*

Be it known that I, ROBERT W. GOTSHALL, a citizen of the United States, residing at Marion, in the county of Marion and State of Ohio, have invented a certain new and useful Improvement in Threshing-Machines, of which the following is a specification.

My invention relates to threshing machines and consists in an improvement in the general type of machine shown in my prior application, filed August 14, 1906, Serial No. 330,531.

More specifically the present improvement resides in the placing of a cage adjacent to the beater arms or rotary fork shown in the aforesaid application and in providing means for agitating said cage.

Inasmuch as the machine here shown in general is substantially identical with the machine shown in said prior application, it will be unnecessary to enter into a detailed description of the same except in relation to the parts which more particularly coöperate with the aforesaid cage.

The principal object of this invention is to provide means for retaining the straw for a considerable period of time in proximity to the rotary fork.

It is also an object to provide means for agitating the said retaining means.

Figure 4:
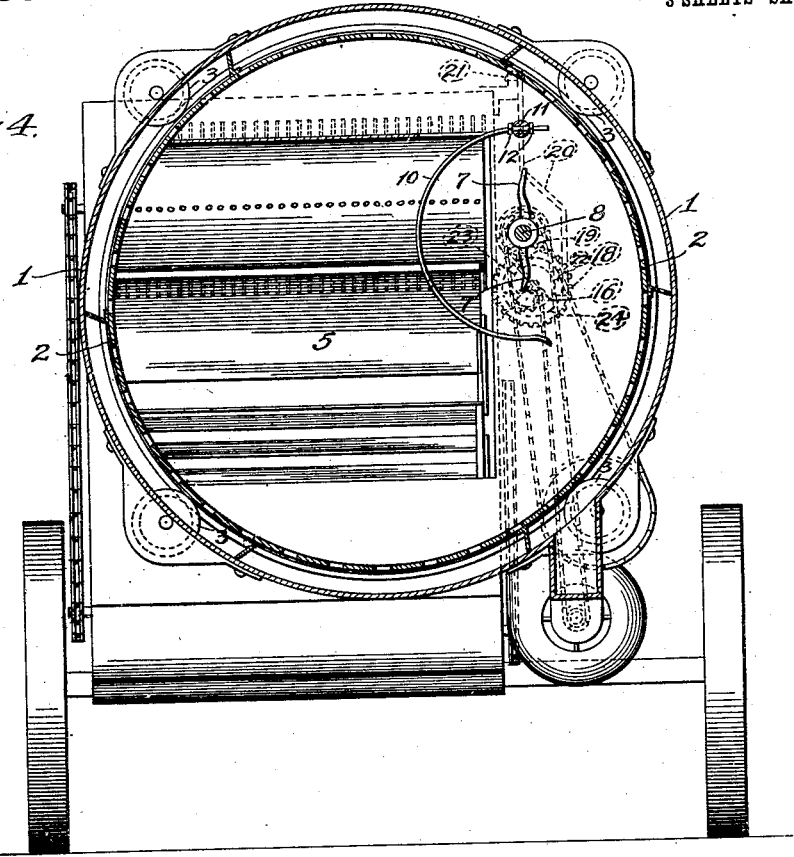
Figure 7:
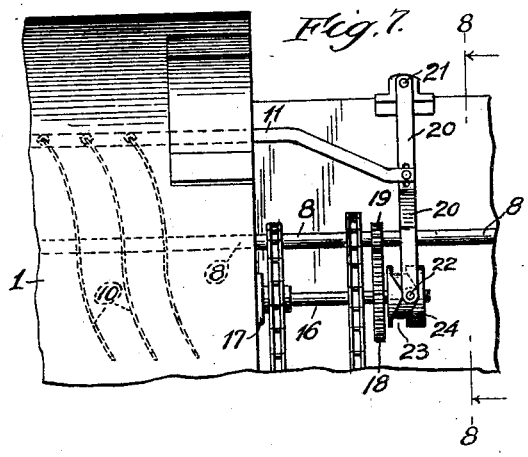
Figure 8:
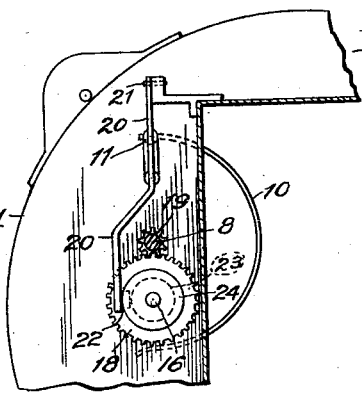

Referring to the accompanying drawings which form a part of this specification: Figure 1 is a central vertical section of the machine. Fig. 2 is a transverse section thereof on line 2—2 Fig. 1. Fig. 3 is a fragmentary detail showing a convenient method of mounting the cage bars. Fig. 4 is a sectional elevation of the machine taken on line 4—4 Fig. 1. Fig. 5 is an elevation taken on line 5—5 Fig. 1 showing mechanism for rocking the cage or grating. Fig. 6 is a side view of the part shown in Fig. 5. Fig. 7 is a side view of a mechanism corresponding to the mechanism shown in Figs. 5 and 6 but designed to agitate the cage or grating in a direction parallel to the length of the machine instead of transversely thereto. Fig. 8 is a sectional view taken on line 8—8 Fig. 7.

Similar numerals refer to similar parts throughout the several views.

The casing 1 of the machine consists preferably of metal and contains the revolving screen 2. Said screen is supported and rotated within the casing by means of the rollers 3 or other suitable mechanism and is adapted to receive partially threshed stock from a primary mechanism, such for example as the one illustrated in Fig. 1 consisting of the threshing cylinder 4 which discharges onto the shoe 5. The screen is provided on the inside with flights 6 whereby the grain is agitated and elevated toward the rotary fork consisting of beater arms 7 secured to the fork shaft 8. As explained in my aforesaid previous application, these fork or beater arms are approximately helical so that they tend to advance the stock through the cylinder and discharge it onto the eye of the discharging fan 9. Thus when the fork arms are taken as a whole they practically constitute an auger and perform three functions; first, to beat the stock and separate the kernels of grain which may be present; second, to thin or spread the body of the stock so that it may be more thoroughly treated; third, they tend to move the stock from the receiving to the discharging end of the screen. By preference the discharging fan is mounted upon the same shaft with the fork arms and in order to obtain the best results said shaft is placed eccentrically within the screen so that the fork arms may somewhat approach the flights 6 in the screen.

The rotary fork consisting of the arms 7 and shaft 8 revolves at a high rate of speed and in order to hold the stock in proximity to the fork long enough to get the full effect thereof I have provided a cage or grating consisting, in its best form, of a set of cage bars 10 supported from the rod 11. The bars 10 are helical in form and mounted in such position as to be concentric with shaft 8. The purpose in making the cage bars helical is to cause them to coöperate with the helical fork arms 7 to move the stock from the receiving to the discharging end of the screen. In the preferred construction said cage bars are of steel and therefore slightly flexible and are secured at their upper end only. The purpose of this is two fold; first, there is nothing at the lower end of the bars to prevent the stock from readily slipping off of them; and second, there is obviated the danger of the bars becoming choked. If the stock is introduced into the machine too rapidly the cage bars will yield and let the mass pass out. The cage bars do not entirely surround the rotary fork, in the best design being about one half the circumference when viewed from the end as in Fig. 2, and the central portion of each bar being about on a level with the fork shaft 8 and lying toward the center of the screen. The manner of attaching the cage bars to rod 11 is non essential but a suitable construction is shown in Fig. 3 in which the rod 11 is apertured to receive the upper end of the bars, and said bars are threaded at their upper end for receiving nuts 12, 12 whereby the bars are held in place.

In operation, the drum is rotated in such direction that the flights 6 will be moving upward when closest to the fork arms 17 and said fork arms will be moving down when closest to said flights. The movements of the parts when proximate are therefore in opposite directions which produces both a threshing and a thinning or spreading action upon the stock. As a result of the presence of the cage or grating, the stock is prevented from being immediately thrown from the fork arms and is returned to them again and again, thereby producing a very thorough and complete separation of the grain from the straw and at the same time moving the straw along through the cylinder and finally delivering it to the eye of the discharging fan 9 which removes the straw from the machine.

Under certain circumstances it becomes necessary in order to deliver and remove the straw from the cage or grating to agitate the latter, and this agitation may be either longitudinal or transverse. The preferred manner of agitating the cage or grating is to give it a slow vibratory movement about bar 8 as a center so as to slowly approach and recede from the rotary fork. Mechanism for obtaining this swinging vibration is illustrated in general in Fig. 1 and in detail in Figs. 5 and 6 of the drawings. In this latter form of agitator the shaft 8 is extended beyond the main portion of the casing 1 and has attached thereto at a point outside of said casing a lever 13 which is pivotally attached at its free extremity to a pitman or eccentric rod 14. This rod works over an eccentric 15 upon a jack shaft 16 mounted in a stationary bracket 17 indicated in dotted lines Fig. 1. Upon said jack shaft is secured a spur gear 18 which engages a pinion 19 rigidly secured to shaft 8. Gear 18 is of larger diameter than pinion 19 and therefore the eccentric 15 will rotate considerably slower than will shaft 8. This is desirable in order to produce a comparatively slow vibration of the cage bars 10 notwithstanding the fact shaft 8 rotates at a high rate of speed. Any other form of reduction gear however may be substituted.

When the machine is in operation and shaft 8 is rotating, pinion 19 will drive gear 18 and eccentric 15 and thus cause a comparatively slow vibration or swinging movement of lever arm 13. This will produce a corresponding vibration of the bars 10 toward and from the rotary fork. As a result of this movement of the cage or grating the straw will readily drop therefrom when the same is raised to the position shown in dotted lines, Figs. 2 and 5.

Longitudinal vibration may be employed to shake the straw and stock from the cage or grating. Mechanism of this kind is illustrated in detail in Figs. 7 and 8. In this form shaft 11 is extended as before but is pivotally connected at its extremity to a shaking arm or lever 20. Said lever 20 is pivoted at the point 21 to some stationary part of the machine and at the other extremity has a roller 22 which travels in a cam groove 23 in cam 24 located upon the aforesaid jack shaft 16. As a result of this last described construction when the shaft 8 is rotated it will rotate cam 24 and produce a swinging movement of lever 20. The parts are so arranged that this swinging movement is in a direction parallel with bar 11 and hence a shaking movement is imparted to the cage or grating. This movement, which is in the direction of the length of shaft 8, tends to shake the straw and stock from the cage and thereby prevents the latter from becoming clogged.

Having thus described my invention, what I claim as new and desire to secure by Letters Patent, is:

1. In a threshing machine the combination with a rotary screen, of a rotary fork therein, a swinging fork partially surrounding said rotary fork, and means for supporting said rotary and swinging forks within said screen, substantially as described.

2. In a threshing machine, the combination of a rotary screen, a rotary fork therein, and bars adjacent to said fork, said bars being approximately helical, conforming approximately to the surface of an imaginary cylinder arranged parallel to the axis of said fork.

3. In a threshing machine the combination of a rotary screen, a rotary fork therein and yieldable bars located at the side of and approximately concentric with said fork and adapted to discharge the stock at a point beneath said fork.

4. In a threshing machine the combination of a rotary screen, a rotary fork therein and bars partially surrounding said fork, said bars being fastened at their upper extremity and free at their lower extremity.

5. A threshing machine having a rotary screen with flights therein for elevating the stock at one side of the machine; a rotary fork within said screen and adjacent to the rising side thereof, and a swinging fork at the side of the rotary fork opposite to the nearest portion of the screen, said swinging fork partially inclosing the rotary fork.

6. A threshing machine having a rotary screen with flights therein for elevating the stock at one side of the machine; a rotary fork within said screen and adjacent to the rising side thereof; bars at the side of the fork opposite to the screen, said bars having a compound curve and extending partially around and along said forks; and an oscillating rod running parallel to the axis of the screen above said fork for supporting said bars.

7. A threshing machine having a rotary screen, a rotary fork arranged therein with its axis parallel to the axis of the screen, curved bars near and partially inclosing said fork, and means for causing said bars to approach and recede from said fork, substantially as described.

8. In a threshing machine the combination of a rotary screen, a rotating shaft therein, a set of arms on said shaft, curved bars adjacent to and partially inclosing said shaft and arms, and means for agitating said bars for preventing the clogging thereof with straw.

9. In a threshing machine the combination of a rotary screen, a rotating shaft therein, a set of arms on said shaft, a swinging fork adjacent to said shaft and arms and partially inclosing the same, and means connected to said rotating shaft for swinging said fork.

10. In a threshing machine the combination of a rotary screen, a casing surrounding the same, a rotary shaft running lengthwise of said screen, arms on said shaft, a rod running parallel to said shaft and adapted to oscillate about its own axis, bars on said rod forming a cage or grating in proximity to said shaft for temporarily holding the stock, and means for oscillating said rod to thereby cause said cage bars to approach and recede from said shaft.

In witness whereof, I have hereunto subscribed my name in the presence of two witnesses.

ROBERT W. GOTSHALL.

Witnesses:
R. L. Shrock,
H. Thompson.